(12) United States Patent
Stoll et al.

(10) Patent No.: US 9,097,564 B2
(45) Date of Patent: Aug. 4, 2015

(54) CONTACTING MODULE FOR SENSOR HAVING LIMITED INSTALLATION SPACE

(75) Inventors: Oliver Stoll, Reutlingen (DE); Christian Roesser, Grossbottwar (DE); Joerg Engelhardt, Ditzingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1223 days.

(21) Appl. No.: 12/679,173

(22) PCT Filed: Aug. 1, 2008

(86) PCT No.: PCT/EP2008/060130
§ 371 (c)(1), (2), (4) Date: Jun. 15, 2011

(87) PCT Pub. No.: WO2009/040169
PCT Pub. Date: Apr. 2, 2009

(65) Prior Publication Data
US 2012/0125130 A1 May 24, 2012

(30) Foreign Application Priority Data
Sep. 21, 2007 (DE) .......................... 10 2007 045 179

(51) Int. Cl.
*G01D 11/24* (2006.01)
*G01D 11/30* (2006.01)
*G01K 1/08* (2006.01)
(Continued)

(52) U.S. Cl.
CPC .............. *G01D 11/245* (2013.01); *G01D 11/30* (2013.01); *G01K 1/08* (2013.01); *G01K 13/02* (2013.01); *G01L 19/0084* (2013.01); *G01L 19/0092* (2013.01); *H01R 4/029* (2013.01); *H01R 13/405* (2013.01); *H01R 13/533* (2013.01); *H01R 43/16* (2013.01); *G01K 2201/00* (2013.01); *H01R 12/58* (2013.01); *H01R 13/6658* (2013.01);
(Continued)

(58) Field of Classification Search
USPC ......................................................... 73/866.5
See application file for complete search history.

(56) References Cited

U.S. PATENT DOCUMENTS 3,959,765 A * 5/1976 Stewart ........................... 338/34
5,628,639 A 5/1997 Eichholz, Jr. et al.
(Continued)

FOREIGN PATENT DOCUMENTS

DE 19526821 1/1997
DE 19731420 1/1999
(Continued)

OTHER PUBLICATIONS

International Search Report, PCT International Patent Application No. PCT/EP2008/060130, dated Feb. 18, 2009.

*Primary Examiner* — Paul West
(74) *Attorney, Agent, or Firm* — Kenyon & Kenyon LLP

(57) ABSTRACT

A sensor which encompasses at least one sensing element for recording at least one measured quantity. The sensor also has one sensor body for holding the sensing element. The sensing element has at least one connecting lead. The sensor has a modular design and includes a contacting module, whose design is separate from that of the sensor body, for electrically contacting the sensing element. The contacting module has at least one connecting element and at least one connector contact pin, the connector contact pin being surrounded in at least one connection region by the connecting element. The connector contact pin is electrically connected to the connecting lead.

14 Claims, 4 Drawing Sheets

(51) Int. Cl.
*G01K 13/02* (2006.01)
*G01L 19/00* (2006.01)
*H01R 4/02* (2006.01)
*H01R 13/405* (2006.01)
*H01R 13/533* (2006.01)
*H01R 43/16* (2006.01)
*H01R 12/58* (2011.01)
*H01R 13/66* (2006.01)
*H01R 43/02* (2006.01)
*H01R 43/24* (2006.01)

(52) U.S. Cl.
CPC ............. *H01R 43/0214* (2013.01); *H01R 43/24* (2013.01); *Y10T 29/49002* (2015.01)

(56) References Cited

U.S. PATENT DOCUMENTS

| | | | |
|---|---|---|---|
| 5,655,921 A * | 8/1997 | Makal et al. | 439/206 |
| 5,820,739 A | 10/1998 | Graser et al. | |
| 5,940,967 A * | 8/1999 | Wuyts et al. | 29/845 |
| 6,272,913 B1 | 8/2001 | Naegele et al. | |
| 7,028,549 B2 * | 4/2006 | Wingsch | 73/715 |
| 7,095,098 B2 * | 8/2006 | Gerbsch et al. | 257/666 |

FOREIGN PATENT DOCUMENTS

| | | |
|---|---|---|
| DE | 20105615 | 8/2001 |
| EP | 0338101 | 10/1989 |
| EP | 0859231 | 8/1998 |
| JP | 1-97817 | 4/1989 |
| JP | 10-505915 | 1/1997 |
| JP | 11-513840 | 4/1997 |

* cited by examiner

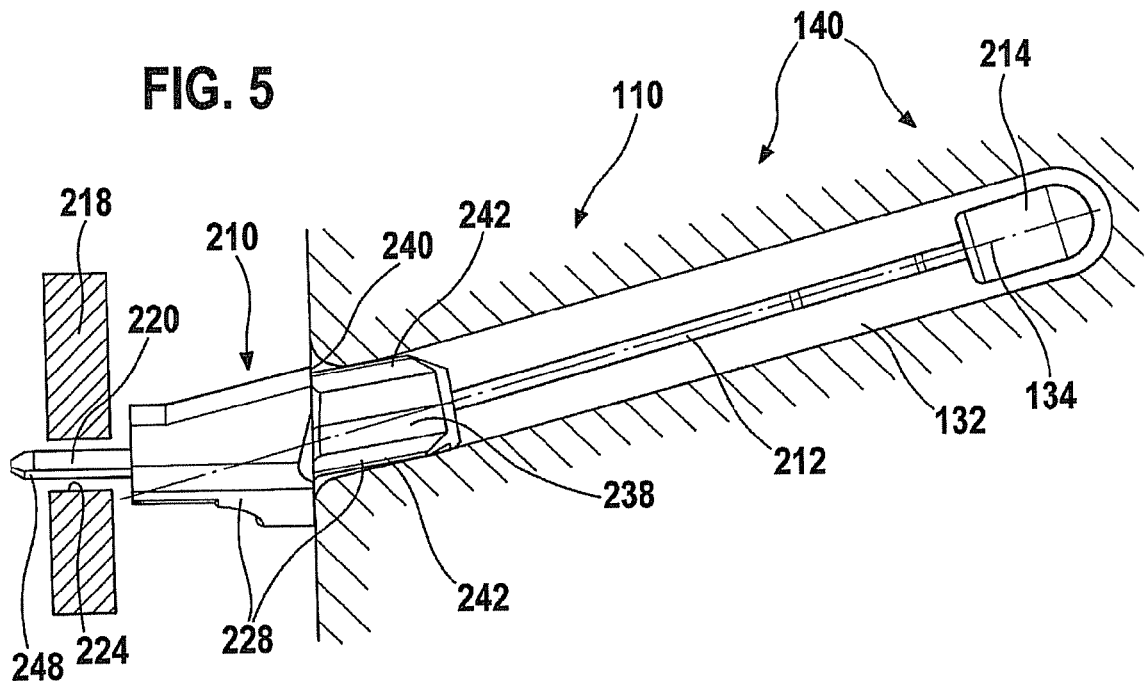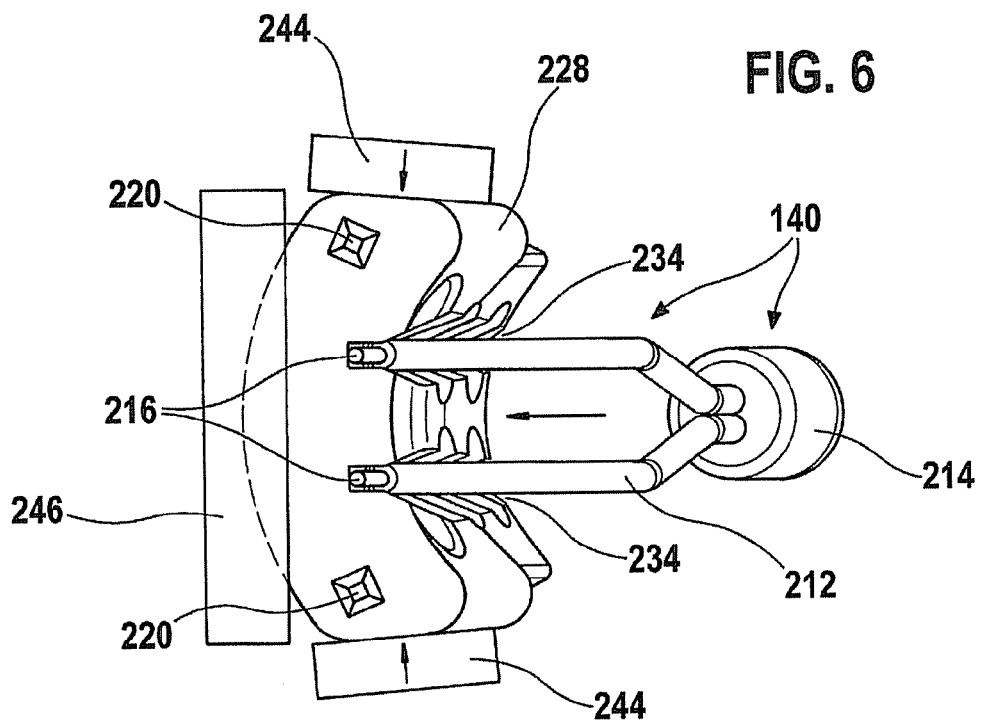

CONTACTING MODULE FOR SENSOR HAVING LIMITED INSTALLATION SPACE

BACKGROUND INFORMATION

There is a need in various fields of technology to measure media, in particular fluid media, such as gases and/or liquids, for example. Such parameters include, for example, a pressure, a temperature, a flow velocity, a density or similar physical and/or chemical properties, respectively parameters of the medium. The present invention relates to applications where a pressure (p) and a temperature (T) are to be simultaneously measured, which is possible, for example, when combination p-T sensors are used. However, the present invention is not limited to p-T sensors of this kind, but is also applicable to other sensors used for measuring at least one property of a medium, in particular of a fluid medium. Pressure and temperature sensors used for air-conditioning systems are an important application example of sensors of the type described above. Air-conditioning systems typically utilize the evaporation heat of a refrigerant to cool air (or another medium to be cooled). The refrigerant is subsequently compressed again in a compressor and thus liquefied. During compression, a heating of the refrigerant occurs. The absorbed heat is generally released again to the ambient environment by a gas cooler. In this context, the compression process carried out by the compressor must typically be controlled in such a way that the operating pressure does not exceed a predefined maximum pressure, and that the operating temperature does not exceed a predefined maximum temperature. The pressure and temperature must be recorded for this purpose. Besides this application example of air-conditioning systems, numerous other application examples of sensors are known, in particular of pressure and temperature sensors from the most widely varying fields of the natural sciences and the engineering sciences, in particular of process engineering and the automotive industry. Other examples to be mentioned, in particular, for sensors having integrated temperature sensors (sometimes also referred to as "combination sensors") include measuring an intake-manifold pressure, measuring air mass using a hot-film air mass flow sensor, and similar applications.

Many of these applications employ a sensing element, for example, a temperature sensor and/or a pressure sensor, that is capable of measuring the at least one property of the medium to be determined. The sensors must typically satisfy various boundary conditions that are derived from the application field and from the production, for example. Thus, in many cases, for example, for a use in air-conditioning systems, combination pressure and temperature sensors (PTS) are encapsulated in a steel threaded component that can be screwed into a wall of the housing containing the fluid medium to be measured. This steel threaded component must meet stringent requirements in terms of leakproofness. For the most part, the installation space that is available for the sensing element(s) within the PTS, in particular, for the temperature sensor (it possibly being a temperature resistor having a negative temperature coefficient, NTC, for example) and for the corresponding electrical contacting of the same, is extremely limited. It is necessary in this case that short circuits be reliably avoided during manufacturing. In many cases, this difficulty is exacerbated by the boundary condition inherent in the system that the measuring point(s), where the at least one quantity of the medium is to be recorded, should reside in the middle of the sensor or in the middle of a flow tube. In addition (depending on the application), the sensor must often meet stringent requirements for resistance to vibration, such as a high load, for example, in the context of measurements performed for a direct gasoline injection.

Therefore, various conventional sensors can be used in the automotive sector, in particular, and make allowances for the problems and boundary conditions discussed above. One exemplary embodiment of a sensor of this kind that is used for recording the pressure and the temperature in the intake manifold of an internal combustion engine, is described in various specific embodiments in German Patent Application No. DE 197 31 420 A1. In this context, a temperature sensor and a pressure sensor are configured in a common housing. To provide for contacting of the temperature sensor, the connecting leads of the temperature sensor are angled, and the ends thereof are set in place in seal-type bonded connections. To contact these connecting leads using externally accessible connector contact pins, it is additionally provided that the connecting leads be connected to the connector contact pins via insulation-displacement connections or, alternatively, by welded or brazed connections.

The conventional sensors such as the sensor described in German Patent Application No. DE 197 31 420 A1, for example, typically provide reliable and media-tight contacting of the individual sensing elements. Nevertheless, these approaches entail some technical challenges that considerably increase the outlay required for a high-volume production. One particular difficulty is still posed by the handling and the contactability of the individual sensing-element leads. To render possible a handling in a high-volume production, sensing elements having comparatively large dimensions and thick leads must typically be used to ensure a safe handling in production and a reliable contacting. However, these additional boundary conditions are not desirable in all cases. If, on the other hand, thin leads are used, the handling is made difficult, and there is an increased danger of short circuits arising among the individual leads. In addition, as long as integrated circuit substrates are used instead of external circuit substrates, an electrical connection between the sensing elements and the circuit substrates presents a challenge. However, in the context of a miniaturization and decentralization, the integration of circuit components in the sensor may be vitally important.

Another difficulty that becomes evident in high-volume production is that it is often necessary to introduce the sensing elements, for example, the temperature sensors, into an oblique and narrow bore of a sensor housing. This is necessary, for example, since in the PTS, for example, a pressure and a temperature are to be measured preferably as centrally as possible on an axis of symmetry of the sensor housing. This is realized, for example, in that an oblique measuring finger containing the temperature sensor extends diagonally up to the sensor axis. This, in turn, makes the sensor installation considerably more difficult.

When it comes to the installation, another problem is still often posed by the need to ensure a reliable vibrational resistance, which must be implemented in such a way, for example, that, even in the case of heavy vibrational loads, short circuits are avoided among individual leads, and that, for example, a reliable and vibrationally resistant connection of the electrical leads of the sensing element to an integrated circuit substrate of the sensor is ensured.

SUMMARY

An example sensor, as well as an example method for producing the sensor are, therefore, provided, which at least substantially overcome the disadvantages of conventional devices and methods. As a result, a reliable high-volume production is made possible, thereby also making it possible for temperature sensors to be installed in a narrow installation space, for example, in narrow, oblique bores. Short circuits are reliably avoided, and the vibrational resistance is considerably enhanced. The handling and the contacting are thereby also made possible in high-volume production; sensors having circuit substrates also being producible, and a reliable electrical connection between the sensing elements of the sensor and the circuit substrate being attainable.

Thus, an example sensor is provided which has at least one sensing element for recording at least one measured quantity and one sensor body for holding the sensing element. In this respect, the sensor that is provided may correspond, for example, to one of the sensors described above for recording at least one measured quantity of a medium, in particular, of a fluid medium. Particular emphasis is placed on the application in sensors that record a temperature and/or a pressure. However, the present invention is also applicable to other types of sensors. The sensing element, which, for example, may encompass a temperature resistor, in particular, a resistor having a negative temperature coefficient (NTC), has at least one connecting lead, typically two or more connecting leads, that are electrically contacted.

In contrast to conventional sensors, such as the sensor described in German Patent Application No. DE 197 31 420, for example, where the contacting of the sensing element is integrated in the sensor housing itself, the present invention provides for a modular design for the sensor itself and a separate contacting module for electrically contacting the at least one connecting lead. This contacting module establishes a secure, mechanically stable and vibrationally resistant connection, which reliably avoids short circuits between the connecting leads and also permits a high-volume production. A separate contacting module is understood in this context to be a module whose design is separate from that of the sensor body; thus, it may be separately produced and, for example, be subsequently fully or partially inserted into the sensor body. It may then be fixed in position there, for example, by a substance-to-substance bond and/or by a non-positive and/or a positive connection.

The contacting module has at least one connector contact pin, at least one connector contact pin preferably being provided per connecting lead. These connector contact pins are preferably fabricated from a larger metal part, for example, a sheet-metal part, for example, a sheet-steel and/or sheet-copper part, using lead frame technology, i.e., by employing a stamping technology. In particular, these connector contact pins may be produced as a strip in high-volume production and be joined by metal webs in order to improve workability, it being possible for these metal webs to be subsequently removed during processing, for example, using a stamping process. In this context, a "connector contact pin" is understood to be a substantially mechanically stable part that does not significantly change its form, even when subjected to normal mechanical loads during handling and in use. The designation "pin" does not reveal anything about a possible geometry, so that this pin may be provided in an elongated, rod-shaped form or also in an angled, bent form. Especially preferred is the angularly prebent form for precise alignment; the connector contact pin, as explained in greater detail below, being able to also feature welding surfaces for welding stamps.

The connector contact pin is surrounded in at least one connection region by a connecting element of the contacting module and is electrically connected to the at least one connecting lead. This connecting element should have good electrically insulating properties, in particular, in order to electrically insulate the connector contact pin and/or the connecting lead from the ambient environment and/or from other connecting leads or connector contact pins. The connecting element may be produced, for example, by at least partially extrusion-coating the connector contact pin with a plastic component, it being possible to use plastics, such as polypropylenes, polyamides or similar thermoplastics, that are customarily used in automotive engineering. However, ceramic materials, although less preferable, may be alternatively or additionally used.

The connecting element preferably features at least one groove for introducing the connecting lead. It is particularly preferred when a single groove is provided for each connecting lead. "Groove" is understood in this context to be an elongated recess into which the connecting lead(s) may be inserted, it being possible for the groove to have a rectangular, a rounded or a V-shaped cross-sectional profile, for example. However, other types of profiles are also possible. It is especially preferred when the groove is adapted to the dimensions of the connecting lead in such a way that the connecting lead essentially does not exhibit any mechanical play in the state in which it is inserted into the groove.

The connecting element is preferably implemented in the at least one connection region in a way that permits access to the connector contact pin. The groove is preferably configured in such a way relative to the connection region that, in the case that the connecting lead is introduced into the groove, a contact may be established in the connection region between the connector contact pin and the connecting lead, in particular, at an end of the connecting lead that is stripped of insulation. This means that the connector contact pin and the connecting lead, respectively, one end of the connecting lead, may come spatially very close together in the connection region, so that, for example, these two elements are spaced apart by a distance that is not greater than a diameter of the connecting lead, but is still to be subsumed under the concept of "contact." In this manner, an electrical connection may be subsequently established in this connection region between the connector contact pin and the connecting lead, i.e., following insertion of the connecting lead into the groove, it being possible for a conductive-adhesive bond, a brazed connection, or a different type of electrical connection to be used. It is particularly preferred when a welded connection is used, in particular, through the use of resistance welding using one or more welding stamps. This is made possible, in particular, when the connection region is able to accommodate a welding stamp of this kind. Using this welding stamp, the connecting lead and the connector contact pin may be pressed against each other and welded. Thus, the embodiment according to the present invention of the contacting module in the connection region allows the connector contact pin and the connecting lead to be electrically interconnected.

Thus, the contacting module that is provided establishes a mechanically fixed and electrically secure connection between the connecting leads and the connector contact pins. In contrast to conventional designs, which provide, for example, for direct integration of the sensing elements in a sensor housing (for example, by bonding them into place), the contacting module may, in particular, also be fabricated independently of the remaining components of the sensor. In this manner, a functional test may also be performed prior to the final assembly, for example, which may reduce the amount of rejected material. Also, the modular design provided, which includes a contacting module as a self-contained component, renders possible a greater production parallelism, and thus an increased throughput rate. In addition, a shared contacting module of the type described above may be used for a plurality of connections, for example, for two connections of a sensor. In this case, for example, the contacting module may be designed in such a way that the connecting module encompasses two connector contact pins and two connecting leads that are interconnected, in each case in pairs, the pairs being electrically insulated from one another. It may, in this case, be a question of the two connecting leads of an NTC, for example.

The sensor including the contacting module is particularly suited for a high-volume production. Thus, in particular, the use of an angularly prebent lead frame for the connector contact pins may contribute to a precise alignment of the at least one sensing element, which is particularly advantageous when this at least one sensing element must be aligned in a specific way, for example, relative to a bore. The lead frame technology, in particular, including the use described above of metal webs between the individual connector contact pins, as well as the workability associated therewith as a strip, contribute further to the suitability for high-volume production. Welding surfaces for welding stamps may be implemented, thereby making possible a connection technology that is suited for high-volume production. At the same time, the grooves of the connecting element form reliable guide grooves, which fix the connecting leads of the sensing element(s) in place for the electrical contacting, for example for the welding process, and serve as an assembly aid.

As described above, in one preferred specific embodiment, the grooves may be used for aligning the connecting leads. Accordingly, the at least one connector contact pin may define a connector direction in the connection region, for example, a direction that corresponds to a direction for screwing the sensor into a housing, a direction that corresponds to a connection of the connector contact pin to a circuit substrate, or a different direction. The connector direction should extend generally in parallel to the longitudinal extension of the connector contact pin. To align the at least one connecting lead, the at least one groove may then be oriented at an angle to the connector direction, for example, at an angle of between 0° and 90° thereto. Especially preferred are orientation angles of between 10° and 25°, and especially within the range of between 15° and 20°, since these angular ranges are especially suited for introducing a temperature sensor at an angle into a bore of a combination pressure-temperature sensor.

The at least one connecting element, respectively, the contacting module, may preferably also be used when installing the sensor, in order to facilitate the process of introducing the at least one sensing element into a bore, for example, into an oblique bore, for example, a bore within a measuring-finger housing of the sensor. For this purpose, in the region of the at least one groove, the at least one connecting element may preferably feature at least one insertion portion for introducing the sensing element into a sensing-element bore. In this context, the insertion portion should preferably be at least partially oriented substantially in parallel to the groove, deviations from parallelism also being possible, for example, deviations of not more than 20°, preferably of not more than 15°. To limit an insertion depth of the sensing element into the sensing-element bore and/or of the insertion portion into the sensing-element bore, the insertion portion may also feature at least one limit stop. In addition, one or more latching noses that are capable of fixing the insertion portion in position, in particular, rotationally, in the sensing-element bore, may be provided peripherally on the insertion portion. A uniform and reliable assembly technology that is suited for a high-volume production and that entails minimal component tolerances, is thereby made possible.

The contacting module may be used very preferably in a sensor according to the present invention, which, besides the at least one contacting module, also features at least one sensing element for recording at least one measured quantity, the sensor, in turn, having at least one connecting lead. As described above, sensors of this kind may be used, in particular, as combination pressure-temperature sensors (PTS). In the case of the sensor that is provided, the at least one connector contact pin of the contacting module and the at least one connecting lead of the sensing element are interconnected, for example, at one end of the connecting lead. As described above, this connection may encompass almost any given conductive connection, however, a substance-to-substance bond, in particular, a welded connection, being preferred.

As described above, it is possible, for example, to use the connector contact pin for an external contacting of the sensor. For this purpose, the connector contact pin, as described in German Patent Application No. DE 197 31 420 A1, for example, may be brought out of a housing of the sensor, for example, at an external connector contact. Alternatively, it is preferred, however, when the sensor itself includes a circuit substrate. This circuit substrate may be accommodated, for example, in a housing of the sensor and may include one or a plurality of electronic components, for example. Integrated circuits used for signal processing or for implementing other types of operations, as well as, alternatively or additionally, passive electronic components, for example, may be accommodated on the at least one circuit substrate. In this case, at least one of the connector contact pins (i.e., all or individual connector contact pins) may be connected to at least one electrical contact of the circuit substrate, in particular to one contact bore or plated-through hole. Thus, for example, the circuit substrate may feature one or a plurality of such contact bores, and the connector contact pin is connected therethrough in a brazing process using a through-hole or plated-through hole technology, for example. The connector contact pin which, as described above, may be produced, in particular, using lead frame technology, may provide the mechanical stiffness required for a problem-free insertion into a contact bore of this kind.

Besides the sensor described above and the contacting module, in one of the described specific embodiments, a method is provided in each case according to the present invention for producing a contacting module in one of the described specific embodiments. A strip technology is preferably used for producing the connector contact pins; the intention being here to provide at least two connector contact pins. In this case, at least two connector contact pins may be connected in strip form by at least one web, the at least one web being separated during manufacturing, for example, using a stamping process, in order to mutually electrically isolate the at least two connector contact pins. In particular, the method for producing the connector contact pins may employ a lead frame technology, in which at least one sheet-metal material, in particular a copper-sheet material, is stamped. As described above, the connecting element may be produced, in particular, by extrusion-coating the connector contact pins.

To manufacture the example sensor in one of the illustrated specific embodiments, an example method is provided, in particular, where at least one welding stamp is introduced into the connection region in order to weld the at least one connector contact pin and the at least one connecting lead in this connection region. For example, a plurality of welding stamps may be simultaneously introduced into a plurality of connection regions of the contacting module, thereby allowing the welding operation to be carried out as a highly parallelized process.

BRIEF DESCRIPTION OF THE DRAWINGS

Exemplary embodiments of the present invention are illustrated in the figures and explained in greater detail below.

FIG. 5 shows a cutaway view of a sensor according to the present invention, including a contacting module that is partially inserted into a temperature-sensor bore, in accordance with FIG. 2.

FIG. 6 shows an assembly method for assembling the contacting module in accordance with FIG. 2.

DETAILED DESCRIPTION OF EXAMPLE EMBODIMENTS

Figure 1:
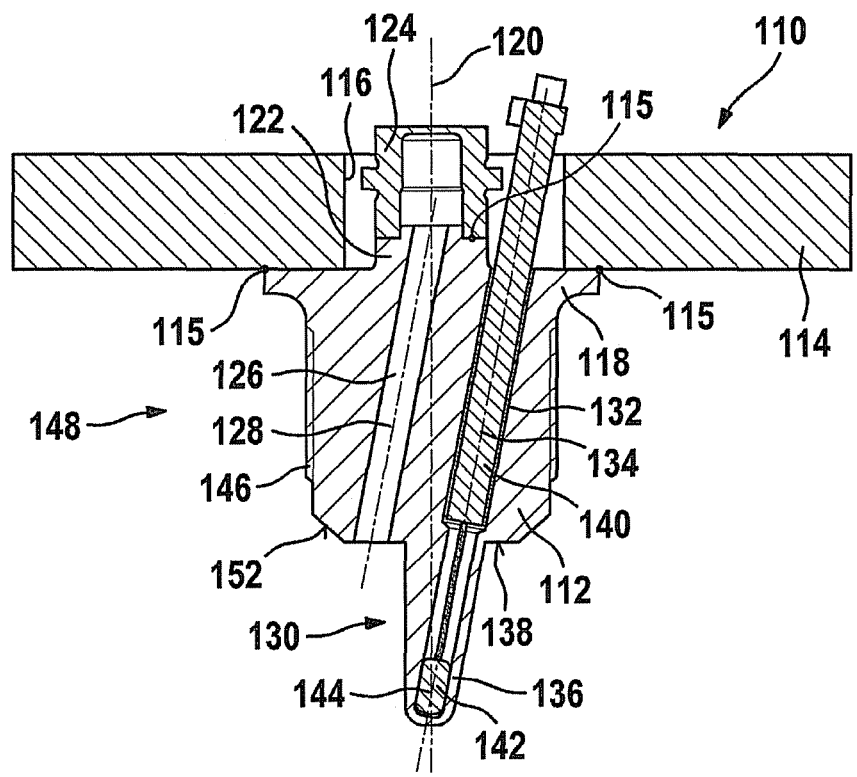
FIG. 1 shows a sectional view of a conventional pressure-temperature sensor.
Figure 2:
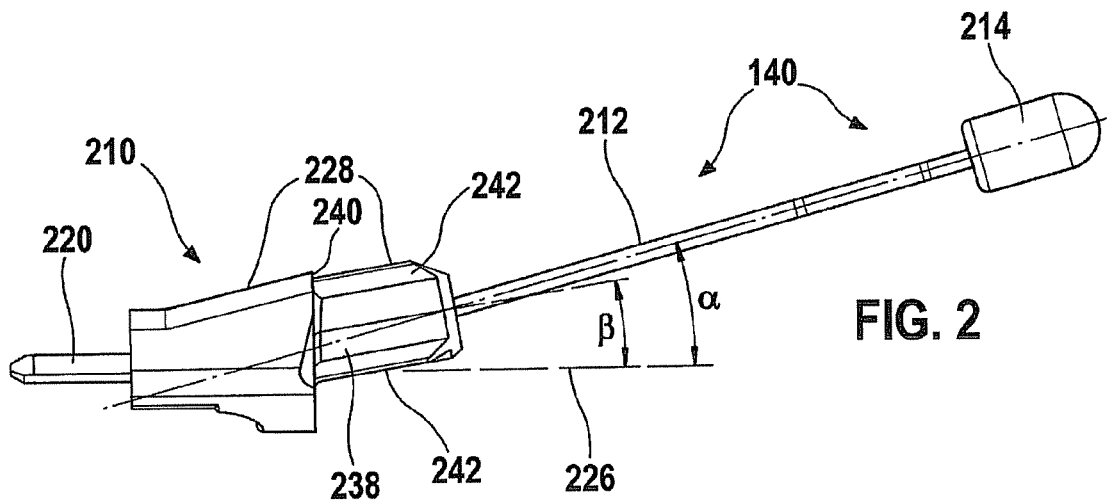
FIG. 2 shows a lateral view of a contacting module having a temperature sensor.
Figure 3:
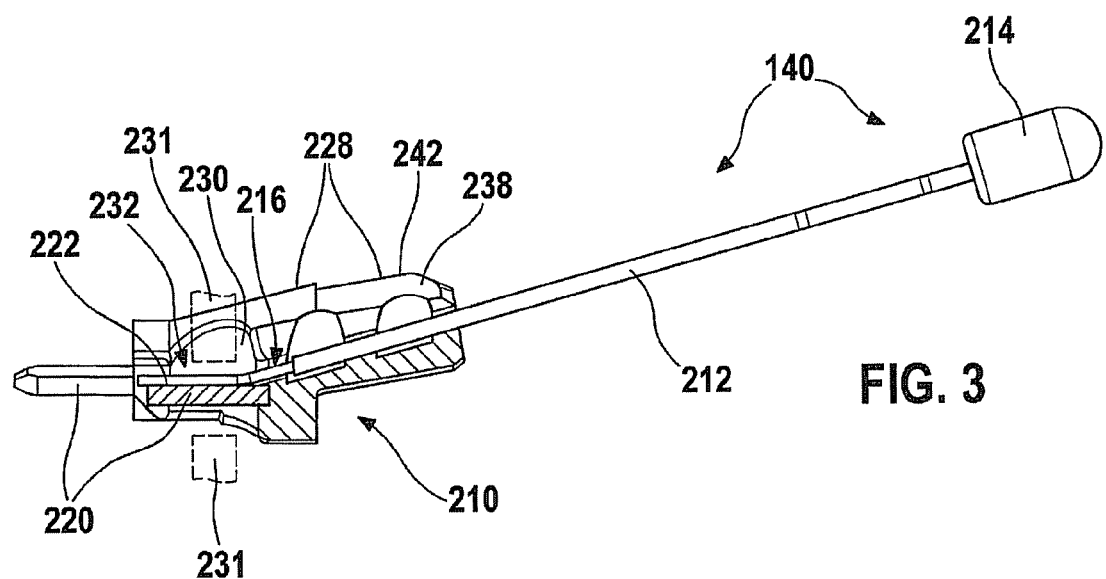
FIG. 3 shows a sectional view of the contacting module in accordance with FIG. 2.

In a sectional view, FIG. 1 shows one possible exemplary embodiment of a sensor 110 as a conventional pressure-temperature sensor. This representation is intended to clarify the general complex of problems posed by contacting, whose solution is to be explained in greater detail with reference to the following figures. Sensor 110 is designed here as a plug-in sensor. The plug-in sensor has a sensor body 112. Provided above sensor body 112 is a hexagon 114 having a central bore 116. Sensor body 112 is joined to hexagon 114, for example, by a substance-to-substance bond 115 (for example, by welding) in such a way that sensor body 112 is configured concentrically relative to central bore 116, and the top side of sensor body 112 is accessible through central bore 116. In this manner, for example, electronic drive components, such as a plug connection for contacting the plug-in sensor, may be configured on the top side of hexagon 114 in FIG. 1. One or more circuit substrates, which are not shown in FIG. 1, may also be configured here in accordance with the above description. These circuit substrates may be used, for example, for processing or preprocessing sensor signals before they are transmitted to the outside, or may be used for supplying current or voltage to the sensor (see reference numeral 218 in FIG. 5). The substance-to-substance bonds of the individual components are generally denoted in FIG. 1 by reference numeral 115. At its upper end facing hexagon 114, sensor body 112 has a shoulder 118 having a bearing surface 154 for purposes of a substance-to-substance bond 115 between sensor body 112 and hexagon 114. Sensor body 112 has a sensor body axis 120. At the top end of sensor body 112, a sensor projection 122 is provided, which, in the assembled state of sensor 110, projects into central bore 116 and, upon which, a pressure sensor 124 is externally mounted symmetrically to sensor body axis 120, and is preferably likewise connected by a substance-to-substance bond 115. It may be a question in this case of a membrane pressure sensor 124, for example.

A through bore 126 having a through-bore axis 128 extends from shoulder 118 to end 130 of sensor 110 facing the fluid medium to be measured. Through-bore axis 128 is slanted away from sensor body axis 120 and forms an angle with the same (in this exemplary embodiment of approximately 10°). Other angles are also possible, as explained in greater detail below. In addition, a temperature-sensor bore 132 having a temperature-sensor bore axis 134 is accommodated in sensor body 112. At its end 130 facing the fluid medium, this temperature-sensor bore 132 ends as blind hole in a measuring finger 136 which, starting from a substantially circular end face 138, projects into the fluid medium. In this context, temperature-sensor bore axis 134 of sensor-body axis 120 is inclined, so that it likewise forms an angle of approximately 10°. Temperature-sensor bore 132 accommodates a temperature sensor 140 which features a temperature-sensor element 142 at the lower end thereof. The temperature-sensor element may be an NTC resistor, for example. Temperature-sensor element 142 is potted into temperature-sensor bore 132, for example, using a thermally conductive adhesive, and thereby simultaneously set in place and thermally coupled into measuring finger 136.

The oblique configuration of temperature-sensor bore 132 relative to sensor-body axis 120 ensures that temperature-sensor element 142 is centrally disposed in the media flow, independently of the orientation at which sensor 110 is introduced into the medium. Accordingly, temperature-sensor bore 132 is selected in this exemplary embodiment in such a way that temperature-sensor element 142 comes to rest precisely in the middle over point of intersection 144 between temperature-sensor bore axis 134 and sensor-body axis 120. Sensor 110 is adapted to be screwable into a plug-in sensor bore (not shown) in a housing. For example, this plug-in sensor bore may be a bore in a housing of a pipe system of an air-conditioning system, for example, of a $CO_2$ air-conditioning system. Alternatively, other applications may also be implemented, for example, an application in the fuel system of a gasoline direction injection. In accordance with the application, measuring finger 136 dips into the fluid to be measured. Accordingly, the length of sensor 110, thus the depth at which point of intersection 144 resides within the fluid medium, is selected in such a way that this point of intersection 144 is preferably configured centrally in a flow tube of the fluid medium. Sensor body 112 features an external thread 146 to allow the plug-in sensor to be screwed into the plug-in sensor bore. In the illustrated exemplary embodiment, this external thread 146 extends merely over one portion of cylindrical jacket-shaped outer surface 148 of sensor body 112. Configured at the transition between cylindrical jacket-shaped outer surface 148 and end face 138 of sensor body 112 is a sealing surface which, in this exemplary embodiment, features the form of a conical seal 152.

The exemplary embodiment of sensor 110 shown in FIG. 1 illustrates the complex of problems posed by the contacting of typical measuring sensors, such as of temperature sensor 140 in this exemplary embodiment, for example. In a method suited for high-volume production, this temperature sensor 140 must be introduced into a bore, in this exemplary embodiment, into temperature-sensor bore 132. At the same time, in a method that is likewise suited for high-volume production, temperature sensor 140 must be electrically contacted in a reliably and vibrationally resistant manner, for example, by a circuit substrate. For this purpose, the use a contacting module 210 in sensor 110 is provided, as is illustrated exemplarily in FIG. 2 through 5. This contacting module 210 may be used, for example, in the context of sensor 110 shown in FIG. 1. However, it may also be used for other types of sensors.

In the illustrated figures, the contacting module is shown in connection with a temperature sensor 140 that has two connecting leads 212 and one temperature-sensor head 214. Connecting leads 212 may be configured in the form of wires, for example, which feature a diameter of merely 0.15 mm at one wire end (216 in FIG. 3) that is stripped of insulation. To observe the present cycle time and to facilitate fitting, respectively, connection into a circuit substrate (see 218 in FIG. 5), connecting leads 212 are affixed to connector contact pins 220 in the form of a tin-plated lead frame, by welding, in particular by resistance welding. For this purpose, connector contact pins 220 may feature contact surfaces 222 as welding surfaces. These contact surfaces 222 are discernible, in particular, in the plan view in accordance with FIG. 4. To ensure a mutual electrical isolation, contact surfaces 222 must not have any electrical interconnection, which, for example, may be implemented by producing connector contact pins 220 in strip form, including the webs disposed therebetween, that are punched out during production (see FIG. 7 below).

To facilitate the placement and positioning of connecting leads 212 of temperature sensor 140 for a later connection to the circuit substrate, in particular, for an introduction into plated-through holes 224 of circuit substrate 218 (see FIG. 5); in accordance with the present invention, contacting module 210 in accordance with FIG. 2 through 5 ensures a precise alignment of connector contact pins 220 relative to connecting leads 212. In particular, in the exemplary embodiment illustrated in the figures, connector contact pins 220 define a connector direction 226, which, for example, may extend in parallel to sensor-body axis 120 in FIG. 1 and which, in this exemplary embodiment, may form an angle α of approximately 17° with connecting leads 212 in one orientation thereof.

To ensure this orientation, contacting module 210 in accordance with FIG. 2 through 5 also includes a connecting element 228 in the form of a plastic extrusion coat. This plastic extrusion coat of connecting element 228 surrounds a portion of connector contact pins 220 and features cutouts 230 at the front and rear side that permit an optimal access, in particular, to a connecting region 232 in which ends 216 of connecting leads 212, that have been stripped of insulation, are connected, for example, welded, to connector contact pins 220, respectively to contact surfaces 222 thereof. Cutouts 230 allow welding stamps 231, for example, to dip into connecting region 232 (see FIGS. 3 and 4, for example), which, for example, render possible a resistance welding of ends 216 of connecting leads 212 to contact surfaces 222 of connector contact pins 220.

Figure 4:
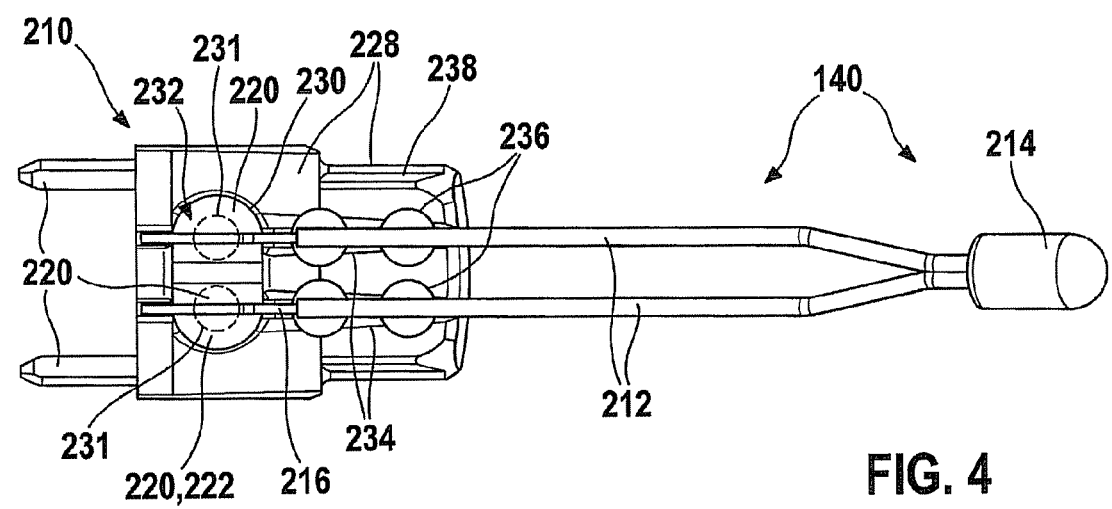
FIG. 4 shows a plan view of the contacting module in accordance with FIG. 2, from above.

To fix connecting leads 212 of temperature sensor 140 in position in the case of connection to connector contact pins 220, in particular, in the case of a resistance welding, and to implement a bearing surface to be used for the insertion during installation, one groove 234 is provided for each of connecting leads 212 in connecting element 220 (see, in particular, FIG. 4). These grooves 234 are used as guide grooves and may include additional insertion cutouts 236, for example, which facilitate an insertion of connecting leads 212 into grooves 234 (see FIG. 4). The advantage of a groove guide in comparison to a complete wire extrusion coat is a virtually frictionless guidance. Due to the different temperature coefficients of the materials that are involved, grooves 234 are hardly able to build up tensile or compressive forces in the individual components of sensor 110.

To facilitate the introduction of temperature sensor 140 into temperature-sensor bore 132 of sensor 110 (see FIG. 5, for example) and to improve a fixing in position in this temperature-sensor bore 132; in this insertion region, connection element 228 features an insertion portion 238 having a limit stop 240. Insertion portion 238 has an angle β relative to connector direction 226 that may typically be between 5° and 25°, thus that may correspond approximately to angle α. In the present case, this angle β is approximately 10°. For a secure anchoring and positional determination within temperature-sensor bore 132, in the following installation steps, insertion portion 238 features a number of latching noses 242 that are configured peripherally on the periphery of the plastic extrusion coat (i.e., connecting element 228) and which are chamfered. They define the position of insertion portion 238 and thus of entire contacting module 210 until circuit substrate 218 is put on in the subsequent installation steps.

To precisely position temperature sensor 140 within a bore of sensor 110, in particular, in a temperature-sensor bore 132, its position is to be precisely determined during manufacturing. For this purpose, a gripper tool may be used that is denoted in FIG. 6 by reference numeral 244. This gripper tool 244 forces a self-centering of connecting element 228 against a stop face 246. Thus, in combination with the insertion aid provided by insertion portion 238, the tolerances for the installation in temperature-sensor bore 132 are minimized.

In a cutaway view, FIG. 5 shows an example sensor 110 according to the present invention that encompasses a contacting module 210. In the illustrated representation, insertion portion 238 of connecting element 228 has already been introduced into temperature-sensor bore 132, and a circuit substrate 218 having plated-through bores 224 has been placed on exposed ends 248. In the illustrated, as well as in other exemplary embodiments of sensor 110 according to the present invention and of contacting module 210, these exposed ends 248 may, for example, be gold-coated, for example, at the surface thereof. For example, a brazed connection may subsequently be produced at plated-through holes 224, between connector contact pins 220 and circuit substrate 218. The advantage of the preferred gold coating of the surfaces is that a better brazed connection is produced and that, for example, a laser brazing may be performed in place of a conventional piston-type brazing, for example.

Figure 7:
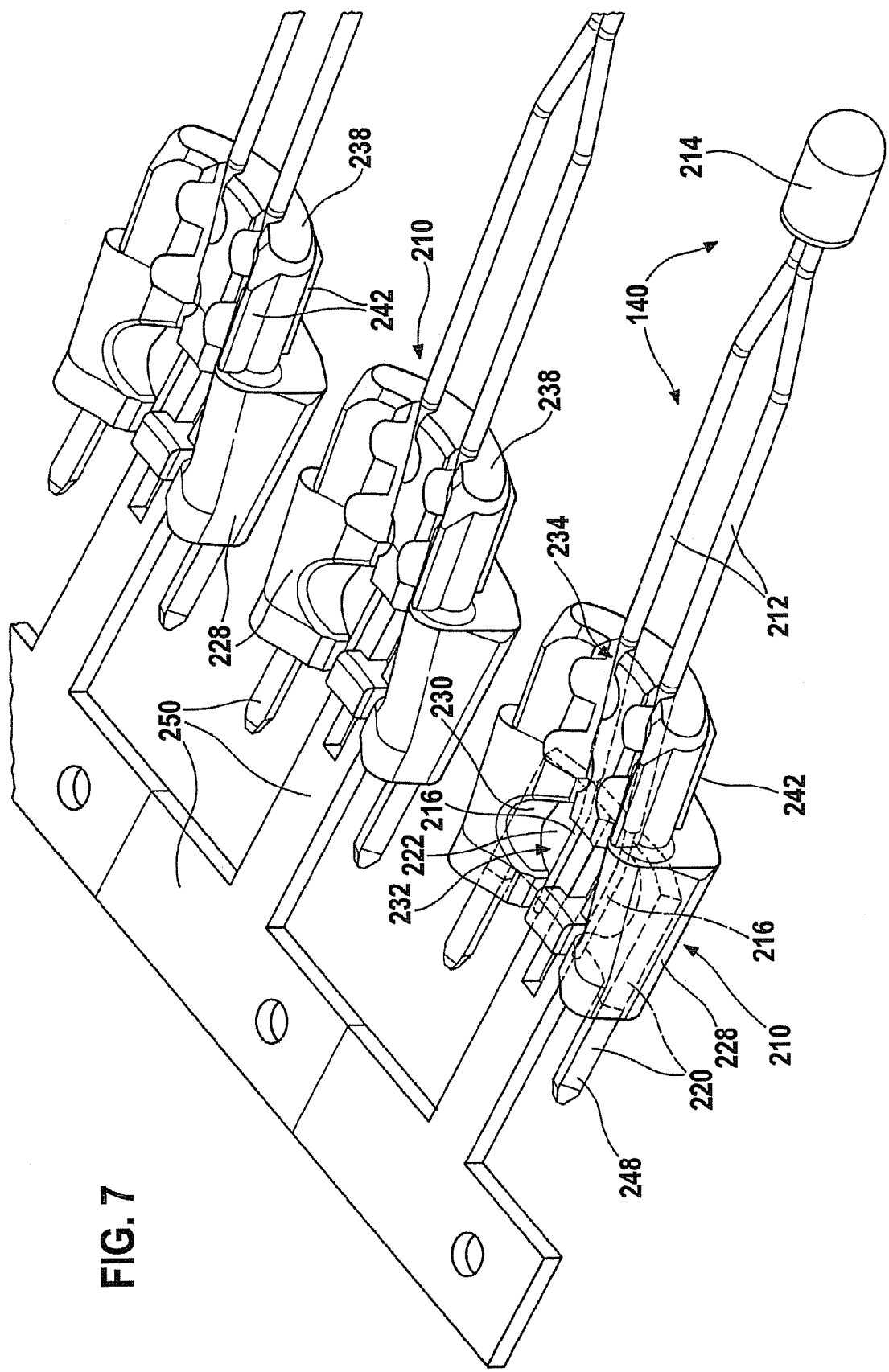
FIG. 7 shows an intermediate step for producing a plurality of contacting modules using a strip method employed in lead frame technology.

Finally, to clarify one preferred production process for sensor 110, a perspective view of an intermediate product in the manufacturing of contacting modules 210 is shown in FIG. 7. A lead frame 250 is used, which, for example, is formed as a strip-shaped stamped-bent part and includes connector contact pins 220 having lug-shaped contact surfaces 222. Connector contact pins 220 are already prebent and may, for example, already be gold-coated accordingly at ends 248 thereof.

Lead frame 250 may be fabricated, for example, from a brass, a copper, or a steel sheet. In addition, among individual contacting modules 210 in the process stage illustrated in FIG. 7, lead frame 250 includes webs 252 that render possible a simultaneous extrusion coating of individual connector contact pins 220 for a multiplicity of contacting modules 210. In this manner, contacting modules 210 may be advantageously produced. Webs 252 may subsequently be removed in a stamping process in order to mutually isolate individual connector contact pins 220.

In addition, in the process stage illustrated in FIG. 7, it is discernible that ends 216 of connecting leads 212 of temperature sensor 140 overlap lug-shaped contact surfaces 222 of connector contact pins 220. This overlapping later allows (see FIGS. 3 and 4) a pressing together of contact surfaces 222 and of ends 216, as well as a resistance welding.

What is claimed is:
1. A sensor, comprising:
at least one sensing element to record at least one measured quantity, the sensing element having at least one connecting lead;

a sensor body to hold the sensing element, the sensor body having a measuring finger and a sensing-element bore, the sensing-element bore ends as a blind hole in the measuring finger and the sensing element is fixed in the blind hole of the sensing-element bore; and a contacting module, separate from the sensor body, to electrically contact the sensing element, the contacting module having at least one connecting element and at least one connector contact pin, the connector contact pin being surrounded in at least one connection region by the connecting element, and the connector contact pin being electrically connected to the connecting lead;

wherein the connecting element has at least one groove for introducing the connecting lead, such that the at least one groove is adapted to provide guidance for the connecting lead; and wherein in the region of the groove, the connecting element has at least one insertion portion for introducing the sensing element into the sensing-element bore, the insertion portion being at least partially oriented substantially in parallel to the groove and has at least one peripherally configured latching nose.

2. The sensor as recited in claim 1, wherein the sensor has a modular design.

3. The sensor as recited in claim 1, wherein the connecting element in the at least one connection region allowing an access to the connector contact pin, the groove being configured in such a way relative to the connection region that, in the case that the connecting lead is introduced into the groove, the connector contact pin and the connecting lead are interconnectable in the connection region.

4. The sensor as recited claim 3, wherein the connector contact pin defines a connector direction in the connection region, the groove being oriented in such a way relative to the connector direction that it forms an angle of between 0° and 90° relative thereto.

5. The sensor as recited in claim 4, wherein the angle is between 10° and 25°.

6. The sensor as recited in claim 5, wherein the angle is between 15° and 20°.

7. The sensor as recited in claim 1, wherein the insertion portion has at least one limit stop for limiting an insertion depth of the sensing element into the sensing-element bore.

8. The sensor as recited in claim 1, wherein in the connection region, the connector contact pin has a contact surface as a welding surface that is planar at least in portions thereof.

9. The sensor as recited in claim 1, further comprising:
at least one circuit substrate, the connector contact pin being connected to at least one electrical contact of the circuit substrate.

10. The sensor as recited in claim 9, wherein the connector contact pin is connected to at least one contact bore.

11. A method for manufacturing a sensor, comprising:
providing at least one sensing element to record at least one measured quantity; the sensing element having at least one connecting lead, a sensor body to hold the sensing element, and a contacting module separate from the sensor body, for electrically contacting the sensing element, the contacting module having at least one connecting element and a connector contact pin, the connector contact pin being surrounded in at least one connection region by the connecting element, and the connector contact pin being electrically connected to the connecting lead;

providing at least two connector contact pins connected in strip form by at least one web;

separating the at least one web during manufacturing to mutually electrically isolate the at least two connector contact pins; and providing at least one groove in the at least one connecting element for introducing the at least one connecting lead, such that the at least one groove is adapted to provide guidance for the connecting lead;

wherein the sensor body includes a measuring finger and a sensing-element bore, the sensing element bore ending as a blind hole in the measuring finger and the sensing element fixed in the blind hole of the sensing-element bore; and wherein in the region of the groove, the connecting element has at least one insertion portion for introducing the sensing element into the sensing-element bore, the insertion portion being at least partially oriented substantially in parallel to the groove and has at least one peripherally configured latching nose.

12. The method as recited in claim 11, wherein the at least two connector contact pins are fabricated using lead frame technology, at least one copper-sheet material being stamped to fabricate.

13. The method as recited in claim 11, wherein the connector contact pin of the contacting module and the at least one connecting lead of the sensing element are interconnected, in that at least one welding stamp is introduced into the connection region, the connector contact pin and the connecting lead being welded using a resistance welding process.

14. A sensor, comprising:
at least one sensing element to record at least one measured quantity, the sensing element having at least one connecting lead;

a sensor body to hold the sensing element; and a contacting module, separate from the sensor body, to electrically contact the sensing element, the contacting module having at least one connecting element and at least one connector contact pin, the connector contact pin being surrounded in at least one connection region by the connecting element, and the connector contact pin being electrically connected to the connecting lead;

wherein the connecting element has at least one groove for introducing the connecting lead, such that the at least one groove is adapted to provide guidance for the connecting lead;

wherein additional insertion cutouts are provided along the at least one groove and are adapted to facilitate insertion of the connecting lead.

\* \* \* \* \*